3,222,351
MONOAZO 8-QUINOLINOL DYESTUFFS
Ernest M. May, Summit, and Andrew Fono, Montclair, N.J., assignors to Otto B. May, Inc., Newark, N.J., a corporation of New Jersey
No Drawing. Filed Apr. 16, 1963, Ser. No. 273,307
1 Claim. (Cl. 260—155)

This invention relates to new dyes; and, more particularly, it is concerned with compounds which are especially suitable for dyeing shaped articles of polyolefins, such as polypropylene, and other hydrophobic thermoplastic resins, such as polyesters, polyacrylics and polyamides.

Many known classes of dyes have been applied to polypropylene and other polyolefins in an attempt to dye these materials in a commercially satisfactory way, that is to say, to yield a dyed product which is fast to washing and dry cleaning. Those classes of dyes which are water-soluble are for this very reason unsuitable for dyeing polypropylene. The water solubility of these dyes means inherently that they are insoluble in polypropylene, and even if a surface dyeing is achieved they are readily removed by washing. Furthermore, the dyes which are "soluble" in polypropylene (a fundamentally hydrocarbon polymer) are also soluble in dry cleaning solvents and those dyes which have affinity for polypropylene are generally removed by dry cleaning solvents.

An object of the present invention is to obtain dye compositions which are suitable for dyeing polypropylene and other polyolefins.

Another object of the invention is to obtain dyes which can be used for dyeing other thermoplastic resins, such as polyesters, polyacrylics, cellulose triacetate and polyamides.

It is common practice in the textile industry to form composite fabrics containing wool and a synthetic thermoplastic polymeric resin. For example, a composite fabric may be woven of threads containing, in a predetermined pattern, threads of wool and polypropylene or some other thermoplastic fiber. In the past, many classes of dyes have been applied to these composite fabrics to give a "union" dyeing. In other words, both the wool and the thermoplastic fiber are dyed to the same hue using normal dyeing procedures. However, this is unsuitable in certain commercial aspects where it is desired to dye the thermoplastic fiber in the composite fabric without dyeing the wool fiber therein.

Accordingly, another object of this invention is to provide a composite mixed fabric of wool fibers and polyolefin, e.g., polypropylene, fibers or other thermoplastic fibers and to produce dyes which will dye the thermoplastic fibers therein and which will not substantially stain or dye the wool therein employing the usual dyeing techniques.

A further object of the present invention is to provide dyes which are fast to washing and severe dry cleaning when applied to synthetic shaped articles, particularly fibers containing finely dispersed metallic compounds.

One of the very difficult problems that has confronted the industry is stabilizing polypropylene and other polyolefin fibers against aging, that is degradation caused by exposure to air, light, and/or heat. Many types of known stabilizers have been incorporated into the fibers to impart some degree of stability thereto. However, these stabilizers generally are removed by washing and/or dry cleaning with various solvents, and the fibers lose most or all of their resistance to aging.

Accordingly, still another object of this invention is to stabilize shaped articles formed from polypropylene and other polyolefins and preferably simultaneously stabilize and pigment such articles.

Another object is to improve stability and the resistance of these polymers to aging, particularly after they have been washed, dry cleaned or exposed to other solvents.

Other objects and advantages of the present invention will appear from the following description.

The dyes which according to the present invention have been found to be particularly suitable for dyeing polypropylene and other polyolefins, are certain substituted monoazo 8-quinolinol compounds described by the following structural formula:

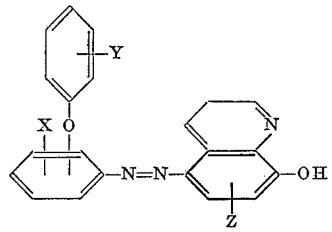

wherein X and Y are independently selected from the group consisting of fluorine, trifluoromethyl, hydrogen, chlorine, bromine and methyl; and Z is selected from the group consisting of hydrogen and methyl. Other substituent groups for the benzene rings besides those indicated above are not within the scope of the present invention.

Preferred dye compounds are those in which both X and Y are hydrogen; in which X is a halogen and Y is hydrogen; in which at least one of the groups X and Y is methyl; and in which at least one of the groups X and Y is trifluoromethyl.

The aforementioned monoazo dyes can be prepared by any known method. However, they are generally formed by coupling a substituted aniline through diazotization with an 8-quinolinol. A finely dispersed paste is preferably formed from the resulting dyestuff, for example, by milling in the presence of a dispersing agent.

In one embodiment, a synthetic shaped article, for example, a fiber, has a metal incorporated therein before a substituted 8-quinolinol compound is applied. In another embodiment of the present invention, the synthetic fiber is not modified with a metallic material. The unmodified or modified synthetic fibers or other shaped articles applicable to this invention include polyolefins, polyesters, for example, condensation products of polybasic acids with polyhydric alcohols and Dacron; polyamides, such as nylon; polymers of acrylic acid compounds, such as acrylonitrile; polymers of vinyl compounds, such as vinyl alcohol, vinyl chloride and styrene; polyacetals, such as polyformaldehyde; and cellulose triacetate. A polyolefin, which is a preferred polymer for a synthetic fiber, includes the following polymers among others: polyethylene, polypropylene, polybutene, poly-3-methyl-butene-1, polypentene, poly-4-methyl-pentene-1, and polyheptene. The polyolefin, e.g., polypropylene, can be prepared by any known method.

Synthetic shaped articles are formed from one or more of the aforementioned thermoplastic polymers or from one or more of these polymers in combination with wool as a composite fabric in accordance with known prior art procedures. A fiber, which is preferred, is defined herein as any fibrous unit, for instance, filament yarns, mats, staple yarns, rovings, sheets, rods, plates, woven fabrics and chopped fibers. The following exemplify specific commercial fibers which can be employed herein: Spun Dacron T-54, Nylon Filament Thread, Cresland T58; Acrilan 1656; Polypropylene 805 Fiber, and Arnel.

The substituted monoazo 8-quinolinol dye compounds heretofore described form the basis of an aqueous dye bath into which the fibers are immersed. Since the dyes are insoluble in water, they must be dispersed in the bath. Any known dyeing technique may be employed in this invention, including the methods discussed and referenced in the article by Fortess, Advances in Textile Processing, vol. 1, pages 333–373, to provide a dyed fiber therefrom.

As stated heretofore, the synthetic shaped article, e.g., a fiber, may be modified with a metallic material. As defined in this invention, "a metal modified synthetic shaped article" is one which contains additional metal therein besides the metal that may be present as residual catalyst from the preparation of the synthetic thermoplastic polymer itself. This added metal in the fiber forms a reaction product with the subsequently applied dye composition. Although the precise nature and structure of the aforementioned reaction product is not clearly understood, it is possible that a chelate ring or linkage is formed between the metallic cation and the hydroxyl group on the 8-quinolinol ring. However, the amount of dye employed for the reaction with the metal and the ratio of fiber to metal are not critical features of this invention.

Any suitable metal or more than one metal may be incorporated into the synthetic fiber or other shaped article. Aluminum, nickel, chromium and zinc are the preferred metals, and they are utilized as metallic compounds. Organic metal salts, for example, may be employed within the range of .02 to .2% based upon the weight of the fiber. Carboxylic acid metal salts with 6 to 20 carbon atoms, which are preferred for this invention, include aluminum stearate, zinc stearate, aluminum laurate, the aluminum salt of 2-ethyl hexanoic acid and mixtures thereof.

The fiber may be modified with the aforementioned metallic materials by any satisfactory method. A satisfactory, but not the only, method (as disclosed in Belgian Pat. No. 617,280 which is incorporated herein by reference) is to disperse intimately an organic metal salt throughout the polymer at any stage prior to its extrusion. An efficient blending apparatus is usually adequate to accomplish this result. After dispersion the blend may be extruded at the fluid temperature for the polymer, i.e., 250° to 350° C. for polypropylene. Accordingly, the metal is usually distributed uniformly throughout the fiber, e.g., polyolefin fiber, which provides complete penetration of the dye from the dye bath into the fibers. By way of illustration, the incorporation of the metal salt in the polymer may be made by mixing 10 parts of the powder of the salt with 90 parts of the powder of the polymer to an intimate and uniformly dispersed mixture. This mixture may be extruded to form a concentrate which subsequently is finely divided again and intimately blended with additional polymer to obtain the desired low concentration of metal for extrusion to the shaped product.

It is also within the purview of this invention to react the aforementioned substituted monoazo 8-quinolinol compound with the metallic material in solution without any shaped article, such as fiber, being present. A pigment is formed thereby which can be recovered and used as a pigment in a manner known in the art.

Thus, in accordance with the present invention substituted monoazo 8-quinolinol compounds have been provided which are suitable dyestuffs. For example, these compounds will react with metal-modified shaped articles to form a dyed end product which is fast to light, dry cleaning and washing. Similarly, these compounds can be applied directly to dye an unmodified fiber since, for example, nylon, polyester, cellulose triacetate and acrylic fibers have polar groups which can form a polar linkage with the present dyes to improve the receptivity of the dye and the fastness properties.

The superior light fastness of the dye on the metal-modified or unmodified shaped article, i.e., no sign of fading after 80 hours in the fadeometer, is a first surprising feature of this invention, since heretofore some fading may occur after only 40 hours in the fadeometer. Secondly, it is surprising that these substituted monoazo 8-quinolinol compounds also impart stability to the polyolefin fibers and other shaped articles and resist removal by laundering, dry cleaning and the like. A third surprising feature is the fact that the dye compounds with two substituent groups on a benzene ring are soluble in polypropylene or other polyolefin fibers. Fourthly, it is indeed unexpected and surprising that if a composite, mixed fiber of wool and a thermoplastic polymer, such as polypropylene, is placed in the usual aqueous dye bath with the present substituted monoazo 8-quinolinol compounds therein, the thermoplastic polymer portion in the composite fabric is dyed but the wool portion in the composite fabric is substantially undyed.

The following example is submitted to illustrate but not to limit this invention. Unless otherwise indicated, all parts and percentages in the specification and claim are based upon weight.

Example I

A 5-(2-phenoxy-5-chlorobenzeneazo)-8-quinolinol dyestuff was prepared by dissolving 74.6 parts (.34 mole) 2-amino-4-chlorodiphenylether in 1000 parts water containing 114 parts concentrated hydrochloric acid (1 mole). The solution therefrom was cooled to 0–5° C., and 23.4 parts sodium nitrite dissolved in 200 parts water were added in ½ hour. The resulting reaction mixture was stirred for one hour, and 10 parts of filter cell were then added with subsequent clarification to form a first solution.

A separate and second solution was formed comprising 52 parts quinolinol (.34 mole) in 200 parts water containing 72 parts sodium acetate and 28.8 parts 50% sodium hydroxide with a pH of 11.3. The first solution was added to the second solution over a period of 3 hours. The reaction mixture therefrom was stirred at ambient temperature for 12 additional hours. The resulting dyestuff was filtered off and the filtrate was finely dispersed to a 10% paste.

Fiber grade polypropylene, which was blended intimately and uniformly with 0.080 wt. percent of aluminum monostearate, was used to manufacture 4½ denier crimped staple fiber by melt extruding, stretching, crimping, and cutting to a 2 in. length. This cut fiber was subsequently carded and spun to produce yarns approximating .10's single (cotton system) count. Convenient sized skeins were then reeled from this yarn.

A sample containing ten grams of skein was provided. This sample was immersed into a 500 cc. dye bath at 120° F. The bath consisted of an aqueous dispersion of 0.6 gram of the dry aforementioned dyestuff. Prior to the entry of the yarn, sufficient acetic acid was added to the dye bath to provide a pH of 6.0. The dyeing was accomplished by gradually raising the temperature of the dye bath to its boiling point during a 30 minute period. The skein was frequently turned with a glass stirring rod and the temperature was maintained at 212° F. for a period of one hour. The yarn was then removed from the dye bath and thoroughly rinsed in running water at 160° F. The skein was subsequently scoured by turning it for 30 minutes at 160° F. in a 400 cc. aqueous bath containing ½% of Triton X-100 (iso-octyl-phenyl poly-ethoxy ethanol) and ½% of sodium carbonate. A thorough rinse was subsequently performed in running water at 110° F.

The dyed sample was then subjected to the following tests.

(1) *Color fastness to dry cleaning.*—Tentative Test Method 85—1960 (1960 Technical Manual of the American Association of Textile Chemists and Colorists, pages 88–9) amended as follows: the temperature shall be 115° F.; the time shall be 1 hour; and the amount of perchloroethylene shall be 200 cc.

(2) *Color fastness to washing (polypropylene).*—Tentative Test Method 61—1960, test number III-A (1960 Technical Manual of the American Association of Textile Chemists and Colorists, pages 93–4). In each instance the dyeings shall rate (for polypropylene) as follows: for color loss, class 5; for staining, class 3 or better.

(3) *Color fastness for washing (synthetics).*—AATCC Tentative Test Method 61—1961 T (page 105 loc. cit.) with test III–A being used for polyester and after-chromed nylon and test II–A for nylon.

(4) *Color fastness to light.*—AATCC Standard Test Method 16–A—1960 (page 90 (loc. cit.).

(5) *Color fastness to oxides of nitrogen in the atmosphere.*—Three cycles were used of Standard Test Method 23—1957 (page 98 loc. cit.) or Standard Test Method 75—1956 (page 100 loc. cit.).

(6) *Sublimation and heat fastness tests.*—Sublimation and heat fastness tests were run at 265° F. for 15 minutes.

The dyed polypropylene fiber had a golden orange shade with outstanding light fastness since the fiber showed no sign of fading after 80 hours in the fadeometer.

The aforementioned dyestuff was similarly applied to nickel-modified polypropylene fiber. The dyed fiber therefrom had a rust shade and also possessed exceptional light fastness properties.

Having set forth the general nature and specific embodiments of the present invention, the scope is now particularly pointed out in the appended claim.

We claim:

A dye composition which is 5-(2 - phenoxy - 5 - chlorobenzeneazo)-8-quinolinol.

References Cited by the Examiner
UNITED STATES PATENTS

| | | | |
|---|---|---|---|
| 2,148,705 | 2/1939 | Mietsche | 260—155 |
| 2,676,956 | 4/1954 | Anderau | 260—155 |
| 2,764,466 | 9/1956 | Bigood | 8—21 |
| 2,869,968 | 1/1959 | Thummel | 8—21 |
| 2,872,440 | 2/1959 | Davies | 260—155 X |

CHARLES B. PARKER, *Primary Examiner.*

A. H. WINKELSTEIN, *Examiner.*